United States Patent
Bushnell et al.

(10) Patent No.: US 8,401,157 B2
(45) Date of Patent: Mar. 19, 2013

(54) SYSTEM AND METHOD FOR PROVIDING AUDIBLE SPOKEN NAME PRONUNCIATIONS

(75) Inventors: William J. Bushnell, St. Charles, IL (US); Thomas J. Broz, Naperille, IL (US)

(73) Assignee: Alcatel Lucent, Paris (FR)

( * ) Notice: Subject to any disclaimer, the term of this patent is extended or adjusted under 35 U.S.C. 154(b) by 1331 days.

(21) Appl. No.: 12/018,870

(22) Filed: Jan. 24, 2008

(65) Prior Publication Data

US 2009/0190728 A1 Jul. 30, 2009

(51) Int. Cl.
*H04M 1/64* (2006.01)

(52) U.S. Cl. .................. 379/88.17; 379/88.21

(58) Field of Classification Search ............. 379/88.18, 379/88.17, 67.1, 221.08, 221.09, 201.07, 379/207.14, 88.12, 88.16, 88.22, 88.23, 88.25, 379/88.27; 709/220–229
See application file for complete search history.

(56) References Cited

U.S. PATENT DOCUMENTS

| | | | | |
|---|---|---|---|---|
| 5,710,864 | A * | 1/1998 | Juang et al. | 704/238 |
| 5,805,772 | A * | 9/1998 | Chou et al. | 704/255 |
| 6,178,232 | B1 * | 1/2001 | Latter et al. | 379/88.21 |
| 6,233,325 | B1 * | 5/2001 | Frech et al. | 379/142.06 |
| 6,272,464 | B1 * | 8/2001 | Kiraz et al. | 704/257 |
| 6,374,221 | B1 * | 4/2002 | Haimi-Cohen | 704/256.1 |
| 6,810,113 | B1 * | 10/2004 | Bedingfield et al. | 379/88.18 |
| 6,901,431 | B1 | 5/2005 | Dodrill et al. | |
| 6,940,954 | B1 * | 9/2005 | Toebes | 379/88.17 |
| 7,263,173 | B2 * | 8/2007 | Cline et al. | 379/1.02 |
| 7,571,100 | B2 * | 8/2009 | Lenir et al. | 704/270.1 |
| 7,646,857 | B2 * | 1/2010 | Caputo et al. | 379/88.19 |
| 7,688,954 | B2 * | 3/2010 | Gatzke et al. | 379/88.21 |
| 2002/0126679 | A1 * | 9/2002 | Morton | 370/401 |
| 2004/0107107 | A1 * | 6/2004 | Lenir et al. | 704/270.1 |
| 2006/0177023 | A1 * | 8/2006 | Vaghar et al. | 379/88.17 |
| 2007/0184857 | A1 * | 8/2007 | Pollock et al. | 455/466 |
| 2007/0189488 | A1 * | 8/2007 | Stoops | 379/207.16 |
| 2008/0267368 | A1 * | 10/2008 | Hirschberg et al. | 379/88.22 |
| 2009/0171669 | A1 * | 7/2009 | Engelsma et al. | 704/275 |
| 2009/0214006 | A1 * | 8/2009 | Campbell et al. | 379/88.13 |
| 2011/0054647 | A1 * | 3/2011 | Chipchase et al. | 700/94 |

FOREIGN PATENT DOCUMENTS

| | | |
|---|---|---|
| EP | 1175075 | 1/2002 |
| WO | WO 00/59193 | 10/2000 |
| WO | WO 02/093431 | 11/2002 |

OTHER PUBLICATIONS

Commweb: "Avaya UC Platform Ties Mobile Workers to the Office". URL: http://www.commweb.com/article/COM20020315S0005, accessed Aug. 16, 2002.
International Search Report, 4 pages.

* cited by examiner

*Primary Examiner* — Simon Sing
(74) *Attorney, Agent, or Firm* — Fay Sharpe LLP

(57) ABSTRACT

A system and method for providing a user with an accurate audible pronunciation of a person's name in a non-call environment using the spoken name pre-recorded and saved at the person's Voice Mail system is described herein. An Application Server can obtain an audio file of a person speaking his or her name for the external Voice Mail System to which he or she subscribes, and provide the audio file to a User requesting to hear an accurate pronunciation of the person's name. The Application Server can provide this spoken name pronunciation feature as part of a Directory Information Service, talking call waiting feature, or to other Online Applications.

20 Claims, 2 Drawing Sheets

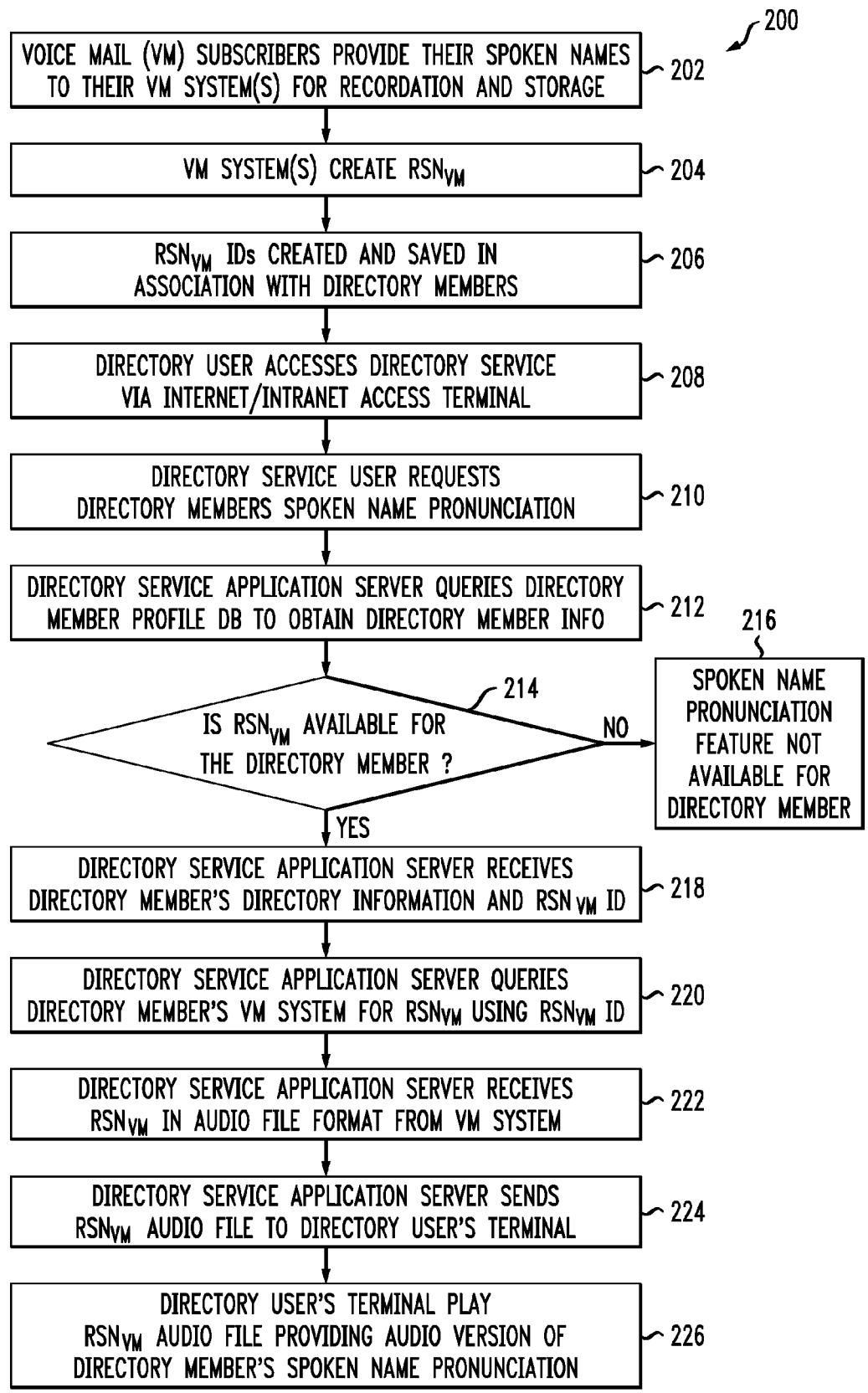

SYSTEM AND METHOD FOR PROVIDING AUDIBLE SPOKEN NAME PRONUNCIATIONS

BACKGROUND OF THE INVENTION

This invention relates to a system and method for providing name pronunciations and more particularly audio versions of spoken name pronunciations retrieved from external Voice Mail systems.

While the invention is particularly directed to the art of a directory service, and will be thus described with specific reference thereto, it will be appreciated that the invention may have usefulness in other fields and applications.

On-line databases are valuable tools which provide information about people to enable effective communication. For example, on-line directory assistance can provide the telephone number and address for people and business in the database. Similarly, many large corporations provide on-line employee directories that provide the full name, address, email address, phone number, mobile phone number, home page URL etc.

With globalization, large enterprises, have more diverse work forces which can even include employees from several different countries. Furthermore, some people may prefer to be called by their middle name or their nickname. Consequently, it is useful to know how to properly pronounce the names of co-workers.

The present invention contemplates a new and improved system and method that resolves these needs and others.

SUMMARY OF THE INVENTION

A system and method for providing a user with an accurate pronunciation of the person's name, using the spoken name recorded and saved at the person's Voice Mail system is described herein In one aspect of the invention, the method includes an Application Server receiving a User request for a person's spoken name pronunciation in a non-call environment, the Application Server sending a Recorded Spoken Name ($RSN_{VM}$) Request query to an external Voice Mail System requesting a $RSN_{VM}$ audio file saved at the Voice Mail System, the $RSN_{VM}$ audio file including recorded audio content of the person speaking the person's name, the Application Server receiving a $RSN_{VM}$ Reply from the Voice Mail System containing the $RSN_{VM}$ audio file, and the Application Server sending the $RSN_{VM}$ audio file to the User at a Network Access Terminal for playback by the Network Access Terminal providing an audio version of the person's spoken name pronunciation.

In another aspect of the invention, the system includes an Application Server connected to a User Operated Network Access Terminal via an http interface for receiving a User request for a person's spoken name pronunciation, the Application Server is connected to an external Voice Mail System via an http interface, or Voice Extensible Markup Language (VoiceXML) interface, for sending a Recorded Spoken Name ($RSN_{VM}$) Request query to the Voice Mail System requesting a $RSN_{VM}$ audio file of a person speaking the person's name saved at the Voice Mail System and sending the $RSN_{VM}$ audio file to the User Operated Network Access Terminal for playback to provide the User with an audio version of the person's recorded spoken name pronunciation.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 2 is a block diagram illustrating a method for providing a User with a person's spoken name pronunciation.

DETAILED DESCRIPTION

Figure 1:
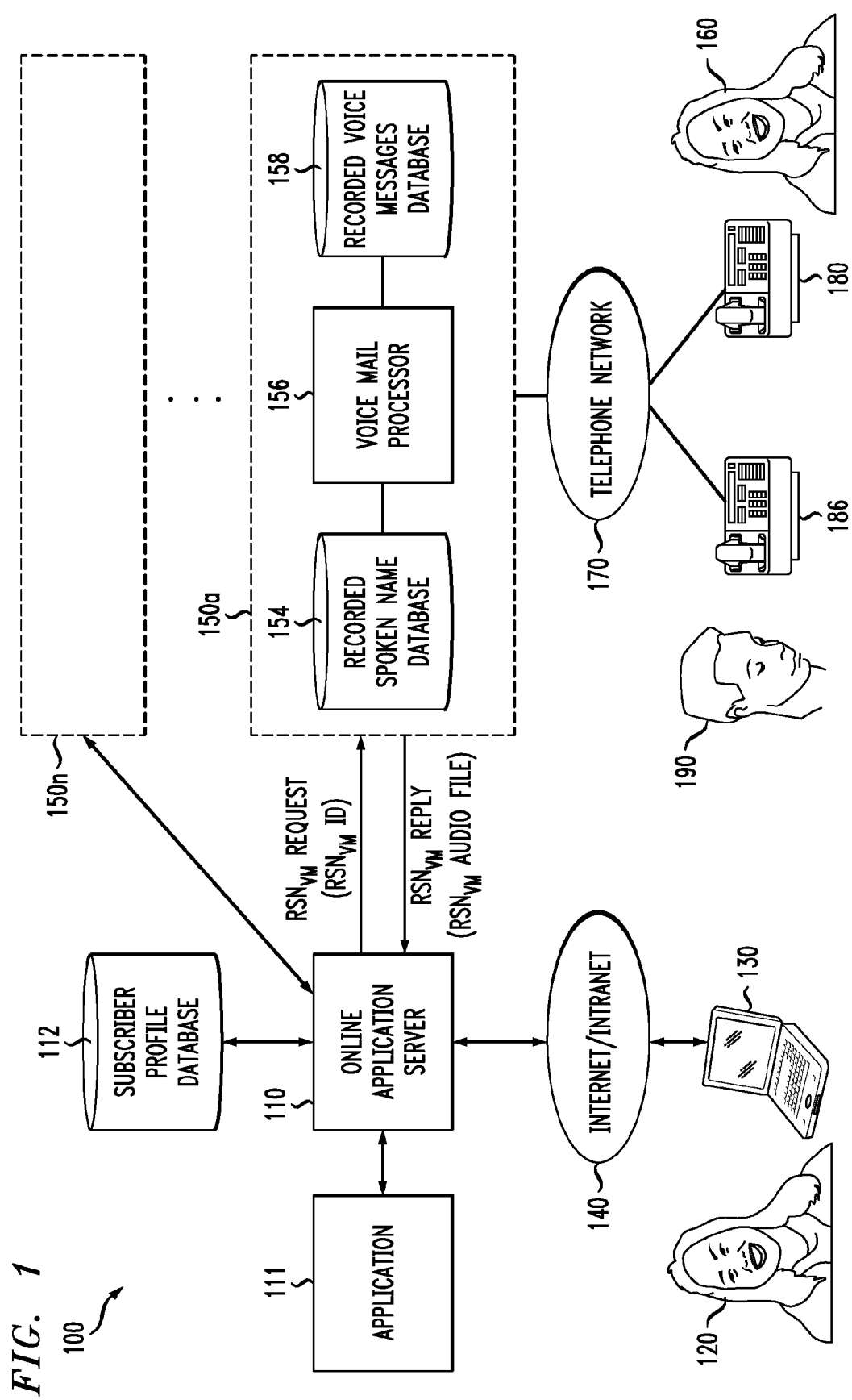
FIG. 1 is a block diagram illustrating the system for providing a User with a person's spoken name pronunciation.

Referring now to the drawings wherein the showings are for purposes of illustrating the exemplary embodiments only and not for purposes of limiting the claimed subject matter, FIG. 1 provides a block diagram view of a system into which the presently described embodiments may be incorporated.

As shown generally at 100, FIG. 1 shows a block diagram illustrating an Online Application Server 110 capable of providing a User with audio versions of people's spoken pronunciations. The pronunciations of people's names are obtained from one or more Voice Mail systems using one or more Web-based queries in a non-call environment, that is without engaging the Voice Mail system in a conventional manner involving a phone call, such as making a phone call, or leaving or attempting to leave a Voice Mail message.

The Application Server 110 is accessible to a User 120 operating a Network Access terminal 130. The Application Server 110 can be an Online, or Web-based, Database Server, or other computing device capable of communicating with Users 120 via the Internet or an Intranet Network shown at 140.

In example, describe in further detail below, the Application Server is an Online Directory Service Application Server providing Directory Information about Directory Members to the User 120, in a non-call environment utilizing http queries directed to the Subscriber's Voice Mail system. The Network Access terminal 130 can be a Personal Computing (PC) device, a wireless telecommunications device, or other terminal capable of web browsing or other forms of Internet/Intranet Network access.

The Application Server 110 is connected to one or more Voice Mail systems 150a-150n via http interface connections. For the purposes of simplicity, a single Voice Mail system 150 shall be described in detail, though it should be appreciated that each will have similar components to those described. For the purposes of clarity, an example is provided for obtaining an audio version of the spoken pronunciation of one Directory Member's name who is a Subscriber to the Voice Mail system 150 as shown at 160. However, it should be appreciated that the Voice Mail system 150 services a plurality of Voice Mail Subscribers one or more of which can be Directory Members and the Application Server can provide one or more Users with spoken name pronunciations for each of them. Furthermore, a plurality of different Voice Mail systems, each servicing a plurality of corresponding Voice Mail Subscribers, can be located and accessed to provide the spoken pronunciations of a plurality of Directory Members' names. Therefore, the Voice Mail Subscriber 160 can be a Directory Member 160 and shall be referred to as such where applicable.

The Voice Mail system 150 includes a Voice Mail processor 156 for controlling the operation of the Voice Mail system and providing the interface with one or more telecommunications networks, one of which is shown at 170. The telephone network 170 can be either a public telephone network operated by a Service Provider, or a private telephone network operated by a large enterprise, such as a company. The telephone networks 170 can be wireline, wireless, VOIP or other suitable networks. The Voice Mail system 150 can be implemented on existing circuit switched Voice Mail Systems or VOIP based Voice Mail Systems.

The Voice Mail system 150 also includes a Recorded Spoken Name Database 154 for storing an audio file containing the Directory Member's Recorded Spoken Name (as collected by the Voice Mail System to which the Directory Member subscribes), which is hereinafter referred to as the Directory Member's $RSN_{VM}$. The Directory Member's $RSN_{VM}$ is a recorded version of the Directory Member's own utterance, collected by the Voice Mail Processor 156 in a conventional manner and saved in the Recorded Spoken Name Database 154 in an audio file format for use in conventional Voice Mail voice messages, as described in further detail below. It is associated with the Directory Member using an identifier, which can be the Directory Member's phone number, for retrieval and use by the Voice Mail Processor 156.

The Voice Mail system 150 also includes a Recorded Voice Messages Database 156 for storing the Voice Mail messages from calling parties, one of which is shown at 190, left or recorded for the Voice Mail Subscribers in a conventional manner. The Recorded Voice Messages Database 156 can also include universal recorded voice messages which are provided to Voice Mail Subscribers and/or callers for guidance in using the Voice Mail system, an example of which is provided below. The Recorded Spoken Name Database 154 and Recorded Messages Database 156 can be the same database or different databases.

When a caller 190 calls the Directory Member's phone 180 and it is busy, or the Directory Member has otherwise directed so, the Voice Mail Processor 162 sends the caller 190 a Voice Message indicating that the Directory Member 160 is not available and prompting the caller to leave a message. For example, this voice message may say "Bill Bushnell is busy. Please leave a message after the tone."

These Voice Messages typically include two portions, the first being the Directory Member's $RSN_{VM}$ "Bill Bushnell", which is used to provide confirmation to the calling party 190 that the intended telephone number (belonging to the called Voice Mail Subscriber 160) has been reached. The second portion, which typically includes the rest of the audio Voice Message, is a universal message the Voice Mail Processor 156 provides to all calling parties giving instructions for leaving messages using the Voice Mail system. It is a universal audio file recorded from a professional announcer retrieved from the Recorded Messages Database 156.

The Directory Member's $RSN_{VM}$ accurately depicts the proper spoken pronunciation of the Directory Member's name because it is a recorded version of the Directory Member saying his or her name. The Directory Member's $RSN_{VM}$ is likely to exist for most Voice Mail Directory Members, since Directory Members are typically prompted to speak their name when they first call into the Directory Member's Voice Mail System 150, for example during Setup procedures provided by the Voice Mail Processor 156 in a conventional manner. Furthermore, since the recording is done using a telephone handset 180 and the recording is typically controlled via touch tone signals, it is easy for the Directory Member 160 to make and edit the recording, if so desired, to provide an accurate and audible name pronunciation. The Directory Member's $RSN_{VM}$ is stored in an audio format file in the Recorded Spoken Name Database 154 for use as described herein.

The system 100 can also include a Directory Member Profile Database 112 connected to the Directory Service Application Server 110 via an http interface. Directory Member Profile Database 112 contains Directory Member information including but not limited to, names, phone numbers, email addresses, etc. The Directory Member Profile Database 112 can be a relational database that can be accessed using the Directory Member's name or phone number or address, or other identifier. When queried, the Directory Member Profile Database 112, provides the Application Server 110 Directory Member information suitable for locating and accessing the Directory Member's $RSN_{VM}$ stored in the Recorded Spoken Name Database 154 of the Directory Member's Voice Mail system 150. This information shall be referred to as the $RSN_{VM}$ Identifier ($RSN_{VM}$ ID). It can be the Directory Member's phone number if a single Voice Mail system 150 is accessible by the Directory Service Application Server 110. It can also include locating information such as the IP Address or Domain Name of the Voice Mail Processor suitable for locating and accessing the Voice Mail Processor associated with the Directory Member for Directory Information Service Applications 100 capable of accessing a plurality of Voice Mail Systems 150.

Referring now to FIG. 2, the method of operation of the Directory Information Service Application 100 providing an audio version of the spoken pronunciation of Directory Members' names utilizing Directory Member's $RSN_{VM}$ shall now be described.

At some previous point in time, shown at 202, the Directory Member 160 provides his or her spoken name for a Voice Mail System 150 for recordation and storage. This can occur by telephone 180 such as when the Directory Member sets up a Voice Mail account as a Voice Mail Subscriber, or in other conventional manners. The Voice Mail System 150 creates an $RSN_{VM}$ as an audio file at 204 and stores it in a Recorded Spoken Name DB 154 in association with the Voice Mail Subscriber for use by the Voice Mail System. An $RSN_{VM}$ ID is also saved in the Directory Member Profile Database 112 in association with the Directory Member at 206.

A Directory Service User 120 then accesses the Directory Information Service Application 100 at 208 seeking to obtain information on a Member of the Directory. The User 120 can use an Internet or Intranet Access Terminal 130, such as a Personal Computer, which communicates with the Directory Service Application Server 110 via a network connection as shown in FIG. 1. The User 120 can request the Directory Member's spoken name pronunciation, such as for example by clicking on an appropriate icon, and the request is sent to the Application Server 110 at 210. The request would identify the Directory Member in some manner.

The Directory Service Application Server 110 then queries the Directory Member Profile Database 112 to obtain Directory Member information at 212. The query can be an http query.

If, at 214, an $RSN_{VM}$ is not available for the Directory Member for which the User has requested the spoken name pronunciation at 210, the Directory Member Profile Database 112 can return Member information for the Directory Member without providing an $RSN_{VM}$ ID at 216. The Member information can be an XML document received by the Application Server 110. In this instance, the spoken name pronunciation for the Directory Member will not be available to the User 120.

If an $RSN_{VM}$ is available for the Directory Member at 214, the Application Server 110 receives Member information which includes the $RSN_{VM}$ ID from the Directory Member Profile Database 112 at 218. The Member information can be provided an XML document received by the Application Server 110.

The Application Server 110, at 220, sends a $RSN_{VM}$ Request query to the Directory Member's Voice Mail System 150 utilizing the $RSN_{VM}$ ID. The $RSN_{VM}$ Request query can be an http query which asks the Voice Mail System Processor 156 to send the $RSN_{VM}$ audio file previously recorded for the Directory Member, as identified by the $RSN_{VM}$ ID. The Application Processor 110 can direct the query to the appropriate one of many Voice Mail Processors 156 available using location information in, or associated with, the $RSN_{VM}$ ID as described above.

The Voice Mail Processor 156 retrieves the $RSN_{VM}$ audio file from the Recorded Spoke Name Database 154 and replies to the Application Server 110 with an $RSN_{VM}$ Reply that includes the $RSN_{VM}$ audio file for the Directory Member 120. For example, the $RSN_{VM}$ Reply can include html pages which include the $RSN_{VM}$ audio file in the form of a .wav file, or other suitable audio file, for playback by the Access Terminal 130.

The Directory Service Application Server 110 sends the $RSN_{VM}$ audio file to the Directory User's Terminal 130 at 224. The User's Terminal 130 plays the $RSN_{VM}$ audio file for the User 120 providing an audio version of the spoken name pronunciation for Directory Member requested by the User at 210 above. In one example, which should not be considered limiting, the Application Server 110 can return a web page to the User's Terminal 130 containing the Directory Member's information, including name, telephone number, work address, email address, etc. The web page can include a hot link, which the User can click on for accessing and listening to the Member's spoken name pronunciation. The User's Terminal 130 can play the $RSN_{VM}$ audio file over a speaker using any suitable conventional media player.

In this manner, the Directory Information Service Application 100 can provide an audio version of the spoken pronunciation of Directory Members' names utilizing the Directory Member's $RSN_{VM}$ obtained from the Directory Members' Voice Mail Systems. Directory Members would not have to provide their Spoken Names for recordation by the Information Directory Service Application Server 110. While Directory Members may be reluctant to record the pronunciation of their names for such Online Directories, these Members do record the pronunciation of their names for the Voice Mail Systems to which they subscribe.

The Directory Information Service Application 100 can be useful to large enterprises, such as companies or the like, providing accurate spoken name pronunciations to employees before they interact with the Directory Members, such as in meetings or conference calls, etc.

The spoken name pronunciation feature provided by the Online Application Server 100 can also be used with other Applications, one of which is shown at 111, connected to the Application Server 110 via http interfaces. These applications 111 can include but are not limited to, Word Processing Programs, Spreadsheet programs, Order Processing programs, customer trouble tickets, voice conferencing services, etc. For example, Applications 111 containing the names of employees can be used by large enterprises to activate the spoke name pronunciation feature in a similar manner as the User request provided to the Application Server 110 at 210 above. The name could be highlighted as a web link in the Application 111, and by right clicking on the name, the User could activate the pronunciation of the person's name. Alternatively, the pronunciation can be automatically concatenated in text-to-speech output to enhance accessibility tools.

Service Providers, other than employers, can offer similar capabilities with such Applications 111 for their Directory Members including social networking web sites, etc. which would enable Users to hear an accurate spoken name pronunciation for persons they desire to interact with.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for providing audio versions of recorded spoken name pronunciations comprising:
   an Application Server receiving a User request requesting a person's spoken name pronunciation via a hypertext transfer protocol (http) interface;
   the Application Server sending a Recorded Spoken Name ($RSN_{VM}$) Request query to an external Voice Mail System requesting a $RSN_{VM}$ audio file saved at the Voice Mail System, the $RSN_{VM}$ audio file including recorded audio content of the person speaking the person's name;
   the Application Server receiving a $RSN_{VM}$ Reply from the Voice Mail System containing the $RSN_{VM}$ audio file; and
   the Application Server sending the $RSN_{VM}$ audio file to the User at a Network Access Terminal via an http interface for playback by the Network Access Terminal providing an audio version of the person's spoken name pronunciation.

2. The method defined in claim 1 wherein the $RSNV_{VM}$ Request query is an http query used in a non-call environment.

3. The method defined in claim 1 further comprising the Application Server sending the Network Access Terminal an html page including a hot link to the $RSN_{VM}$ audio file.

4. The method defined in claim 1 wherein the person is a Member of a Directory Service and the Application Server is a Directory Service Application Server providing the User with Directory information about the Member.

5. The method defined in claim 4 further comprising:
   the Application Server sending an http query to a Directory Member Profile Database for determining if a $RSN_{VM}$ is available for the Directory Member; and
   the Application Server receiving a $RSN_{VM}$ Identifier ($RSN_{VM}$ID) associated with the Directory Member from the Directory Member Profile Database.

6. The method defined in claim 5 wherein the $RSN_{VM}$ ID is the Directory Member's phone number.

7. The method defined in claim 5 further comprising the Application Server using the $RSN_{VM}$ ID to locate the Voice Mail System for sending the $RSN_{VM}$ Request query to the Voice Mail System.

8. The method defined in claim 7 wherein the Voice Mail system includes a Voice Mail Processor and the $RSN_{VM}$ ID includes locating information including an Internet Protocol (IP) Address or a Domain Name of the Voice Mail Processor.

9. The method defined in claim 8 further comprising:
   the Application Server receiving a plurality of User requests from one or more Users for spoken name pronunciations of a plurality of different people;

the Application Server sending Recorded Spoken Name (RSN$_{VM}$) Request queries to a plurality of different external Voice Mail Systems requesting RSN$_{VM}$ audio files saved at the Voice Mail Systems, each RSN$_{VM}$ audio file corresponding to a different one of the plurality of different people;

the Application Server receiving the RSN$_{VM}$ audio files from the Voice Mail Systems; and the Application Server sending the RSN$_{VM}$ audio files to the one or more Users at one or more Network Access Terminals providing audio versions of the spoken name pronunciations of the plurality of different people.

10. The method defined in claim 1 further comprising the Application Server connected to a social networking website Application via an http interface providing Users of the social networking website with the person's spoken name pronunciation.

11. The method defined in claim 1 further comprising the Application Server connected to an Application via an http interface providing Users of the Application with the person's spoken name pronunciation, wherein the Application is one of a word processing program, spreadsheet program, order processing program, and video conferencing service.

12. The method defined in claim 1 wherein the RSN$_{VM}$ Request query is a Voice Extensible Markup Language (VoiceXML) command.

13. The method defined in claim 1 wherein the Network Access Terminal is capable of web browsing and is at least one of a personal computing (PC) device and a wireless telecommunications device.

14. A system for providing a User with an audio version of a person's recorded spoken name pronunciation comprising:

an Application Server connected to a User Operated Network Access Terminal via a hypertext transfer protocol (http) interface for receiving a User request for a person's spoken name pronunciation, the Application Server connected to an external Voice Mail System via an http interface for sending a Recorded Spoken Name (RSN$_{VM}$) Request http query to the Voice Mail System requesting a RSN$_{VM}$ audio file of a person speaking the person's name saved at the Voice Mail System and sending the RSN$_{VM}$ audio file to the User Operated Network Access Terminal for playback providing the User with an audio version of the person's recorded spoken name pronunciation in a non-call environment.

15. The system defined in claim 14 wherein the person is a Member of a Directory Service and the Application Server is a Directory Service Application Server providing the User with Directory information about the Member and further comprising:

a Directory Member Profile Database connected to the Application Server for sending the Application Server an RSN$_{VM}$ Identifier (RSN$_{VM}$ ID) associated with the Directory Member from the Directory Member Profile Database.

16. The system defined in claim 15 wherein the Voice Mail system includes a Voice Mail Processor and the RSN$_{VM}$ ID includes locating information including an Internet Protocol (IP) Address or a Domain Name of the Voice Mail Processor.

17. The system defined in claim 16 further comprising:

the Application Server connected to a plurality of different external Voice Mail Systems via http interfaces for sending Recorded Spoken Name (RSN$_{VM}$) Request http queries requesting RSN$_{VM}$ audio files saved at the Voice Mail Systems, each RSN$_{VM}$ audio file corresponding to a different one of a plurality of different people for providing a User with a spoken name pronunciation.

18. The system defined in claim 17 wherein the Voice Mail systems include Voice Mail Processors and the Directory Member Profile Database includes an RSN$_{VM}$ ID associated with each of the different one of a plurality of different people, the RSN$_{VM}$ Identifiers (RSN$_{VM}$ IDs) being an IP Address or a Domain Name of the Voice Mail Processors.

19. The system defined in claim 14 further comprising the Application Server connected to a social networking website Application via an http interface providing Users of the social networking website with the person's spoken name pronunciation.

20. The system defined in claim 14 wherein the User Operated Network Access Terminal is capable of web browsing and is at least one of a personal computing (PC) device and a wireless telecommunications device.

* * * * *